UNITED STATES PATENT OFFICE.

JOHN E. SIEBEL, OF CHICAGO, ILLINOIS.

IMPROVEMENT IN RECOVERING PHOSPHORIC ACID AND PURIFYING AMMONIA.

Specification forming part of Letters Patent No. 156,181, dated October 20, 1874; application filed July 20, 1874.

*To all whom it may concern:*

Be it known that I, JOHN E. SIEBEL, of the city of Chicago, in the county of Cook and State of Illinois, have invented certain new and useful improvements in the reclamation of phosphoric acid used in the manufacture of gelatine or glue from bones and analogous substances, and in the reclamation of ammonia and its purification when crude, when used in the process, of which the following is a full description:

The primary object of this invention relates more especially to the reclamation of phosphoric acid after it has been used for or produced in the treatment of bones and analogous substances to produce gelatine.

Heretofore this has been usually done by the use of sulphuric acid, but the sulphuric acid is lost in every process, and so constitutes an item of great expense.

In order to obviate this loss and to improve the process, I use ammonia, which can be recovered after each procedure and used over again repeatedly without material loss.

I effect this in the following manner: The solution of phosphate of lime obtained in the treatment of bones with phosphoric acid is decanted from the gelatine and saturated with ammonia. The lime is precipitated as phosphate of lime, and a solution of phosphate of ammonia remains. This solution is evaporated to dryness, and is heated in any convenient furnace or retort. The ammonia is volatilized by this treatment, and it may be collected in the usual way and preserved for future use, or it may be used immediately by running it into a new batch of material ready to be operated upon.

The phosphoric acid which remains behind after the ammonia has passed off is also ready to be used again upon new quantities of bones.

In place of pure ammonia I also use the crude ammonia produced by boiling the ammoniacal liquors obtained in the manufacture of coal-gas, or in the manufacture of bone-black and animal charcoal, with lime or other suitable substance.

The crude ammonia, by being repeatedly used in this process, is gradually refined and purified, so that this process may also be used as a means of purifying ammonia obtained from such sources or processes.

What I claim as new, and desire to secure by Letters Patent, is—

1. The reclaiming of phosphoric acid by the use of ammonia after the acid has been used in the treatment of bones, substantially as specified.

2. The process of purifying crude ammonia herein described by using it with phosphoric acid, substantially as set forth.

JOHN E. SIEBEL.

Witnesses:
 L. L. BOND,
 O. W. BOND.